United States Patent [19]

Guilbault et al.

[11] Patent Number: 4,698,162

[45] Date of Patent: Oct. 6, 1987

[54] METHOD FOR PREVENTION OF METALLIC PRECIPITATE REOXIDATION/REDISSOLUTION IN AQUEOUS SYSTEMS

[75] Inventors: Lawrence J. Guilbault, Topsfield; Jeffrey A. Ulman, Beverly, both of Mass.

[73] Assignee: Morton Thiokol, Inc., Chicago, Ill.

[21] Appl. No.: 806,151

[22] Filed: Dec. 6, 1985

[51] Int. Cl.$^4$ .............................................. C02F 1/52
[52] U.S. Cl. .................... 210/710; 210/719; 210/726; 210/728; 210/912
[58] Field of Search ............... 210/689, 702, 710, 719, 210/723, 726, 728, 729, 912; 422/13, 14, 16; 204/DIG. 13

[56] References Cited

U.S. PATENT DOCUMENTS 3,857,765 12/1974 Merker et al. ...................... 210/729
3,985,503 10/1976 O'Neal, Jr. .............................. 422/16

OTHER PUBLICATIONS

R. Walker, "Benzotriazole as a Corrosion Inhibitor for Immersed Copper", *Corrosion*, vol. 29, No. 7, Jul. (1973), p. 290.
Metal Finishing Guidebook, 52nd Issue (1984), pp. 286–287.

*Primary Examiner*—Richard V. Fisher
*Assistant Examiner*—Jeffrey W. Peterson
*Attorney, Agent, or Firm*—Richard J. Sheridan; Gerald K. White

[57] ABSTRACT

Redissolution and/or reoxidation of metals precipitated by chemical reduction from aqueous solutions can be prevented by adding a bicyclic, aromatic, organonitrogen compound to the solution in a amount insufficient to cause precipitation of said metal but sufficient to prevent the redissolution and reoxidation of the precipitate. The compounds added can be selected from benzotriazoles, benzothiazols and benzimidazoles.

16 Claims, No Drawings

METHOD FOR PREVENTION OF METALLIC PRECIPITATE REOXIDATION/REDISSOLUTION IN AQUEOUS SYSTEMS

BACKGROUND OF THE INVENTION

1. Field of the Invention

This invention relates to the treatment of metals which have been precipitated from aqueous waste solutions to prevent the redissolution and/or reoxidation of the precipitated metal.

2. Description of the Prior Art

A commonly used method of removing metal ions from industrial effluents to allow compliance with EPA and local discharge requirements is chemical reduction. Sodium borohydride sodium dithionite (hydrosulfite), and hydrazine are typical reducing agents for this application. In a waste treatment scheme, they are added to the effluent to reduce the contained metal ions to an insoluble precipitate (which for the most part is the zero valent metal). The precipitate is then allowed to settle in a clarifier. After an appropriate residence time, the supernatant liquid in the clarifier is decanted, and either discharged directly or passed through a filter prior to discharge. Instances occur, however, when the precipitated metals redissolve by reoxidation before the solid/liquid separation step can be conducted. Such instances are particularly common in dilute solutions when the precipitate often consists of fine particles, and when metal complexing agents, such as ammonia, EDTA and gluconate are present in the solution. Redissolution can occur to such an extent that metals levels in the solution increase above discharge limits. The solution must then be treated a second time.

Alternate treatment methods for these waste streams containing complexed metal ions are known in the literature. The aforementioned complexing agents can be "tied up" by addition of metal ions that form stronger complexes with these agents than do the metal ions to be removed. Ferrous sulfate and lime (Ca(OH)$_2$) are the most commonly used additives for this purpose. However, their use results in formation of very large sludge volumes that can make succeeding steps (clarification, filtration) difficult and time-consuming. Also, cost of disposal of the sludge is thereby increased. Destruction or removal of complexing agents so that they cannot recombine with the precipitated reduced metal have been described. Destruction of free EDTA must be done under highly acid conditions using strong oxidizing agents. When the EDTA is present in a stable complex ion with a metal such as copper [Cu(EDTA)$^{2-}$], the destruction is more difficult, if not impossible. Removal of ammonia can be accomplished by heating with air-sparging or by acid addition to convert NH$_3$ to non-complexing NH$_4^+$. The former is an energy-intensive process, while the latter requires that low pH conditions be maintained throughout the process to prevent reformation of NH$_3$. Removal of dissolved oxygen can help to inhibit redissolution of precipitated reduced metals. The most frequently used oxygen scavenger in the industry is hydrazine. However, use of hydrazine is undesirable because of its toxic nature, and should be avoided if possible.

The present invention employs bicyclic, aromatic, organonitrogen compounds such as benzotriazole, benzothiazole and benzimidazole compounds to prevent redissolution and/or reoxidation of metals (e.g. copper, nickel, cobalt) which have been precipitated from aqueous waste solutions by chemical reduction. Benzotriazoles are known to prevent corrosion of copper surfaces which are immersed in aqueous solutions. It is believed that these compounds form complexes with metal surfaces and the resulting protective layer reduces corrosion. For example, R. Walker, "Benzotriazole as a Corrosion Inhibitor for Immersed Copper," *Corrosion-NACE*, Vol. 29, No. 7 (1973), p. 290 discloses that when benzotriazole is added to an aqueous solution, corrosion of a copper object placed therein is reduced compared to an aqueous solution without benzotriazole. The benzotriazole forms a coating on the surface of the copper and forms a complex with the copper, thereby protecting it. Formulation of the metal/benzotriazole complex seems to be confirmed by Chadwick, D et al., *Corros. Sci.*, 1978, 18(1), 39–51 and Ogle, I.C.G. et al., *Can. Metall. Q.*, 1975, 14(1), 37–46. However, while benzotriazole provided corrosion inhibition in a variety of aqueous solutions, it did not inhibit corrosion in aqueous complexing and oxidizing solutions, such as those commonly found in metal-containing waste streams.

As reported in R. Walker, "Corrosion Inhibition of Copper By Tolyltriazole", *Corrosion-NACE*, Vol. 32, No. 8 (1976), p. 339 tolyltriazole having the formula:

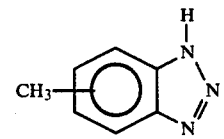

was found to be generally as good as, or better than, benzotriazole in inhibiting the corrosion of copper objects immersed in various aqueous solutions. Aqueous complexing and oxidizing solutions, however, were apparently not tested with tolyltriazole. R. Walker also discloses in *Corrosion (Houston)*, 1975, 31(3), 97–100 the use of triazole, benzotriazole and naphthotriazole as corrosion inhibitors for copper in acidic, neutral and alkaline solutions. Naphthotriazole was found to be the most effective inhibitor.

Walker further discloses in R. Walker, "Benzotriazole a Corrosion Inhibitor for Antiques," *J. Chem. Ed.*, Vol. 57, No. 11 (1980), p. 789 that benzotriazole can be used to protect and preserve antiques made from copper and copper alloys. Silver, gold, aluminum, brass, bronze, zinc, cadmium and steel are also cited as candidates for protection with benzotriazole.

While the aforementioned articles provide some evidence of the corrosion inhibitive properties of benzotriazoles, all of the experimental work disclosed therein was conducted on metal objects (primarily those made of copper) in the form of sheets, tubes and the like. No work was conducted on metal precipitated by chemical reduction from aqueous waste solutions and these references indicate that the benzotriazoles would not be effective in such waste solutions that contain oxidizers or complexing agents.

Japanese Patent Application No. 81202/1974 to Ochiai et al. relates to the use of benzotriazole to precipitate heavy metals from solution. The benzotriazoles are employed in amounts of 2 or more moles of benzotriazole per mole of metal and form chelates with the metal which are insoluble in the matrix liquor. The metal chelates precipitate and are recovered.

Japanese Patent Application No. 19260/1975 involves the use of a solid carrier with benzotriazole absorbed in it or a solvent which contains benzotriazole but which is not soluble in water. An aqueous solution containing heavy metals is allowed to contact the solid carrier or solvent. The metal is thereby extracted from the aqueous solution.

SUMMARY OF INVENTION

In accordance with the present invention there is provided a process for preventing redissolution and reoxidation of metal precipitates in an aqueous complexing or oxidizing waste solution, said metal having been precipitated by chemical reduction, said process comprising adding to the aqueous waste solution, in an amount insufficient to cause precipitation of the metal but sufficient to prevent redissolution and/or reoxidation of the precipitate, a compound selected from bicyclic, aromatic, organonitrogen compounds. The organonitrogen compounds may be added to the aqueous solution either prior to or after precipitation of the metal by chemical reduction.

Also in accordance with this invention there is provided an improved process for removing dissolved metal from an aqueous waste solution by precipitating the metal by chemical reduction, the improvement comprising preventing redissolution and reoxidation of the precipitated metal by adding to the aqueous waste solution, in an amount insufficient to cause precipitation of the metal but sufficient to prevent redissolution and/or reoxidation of the precipitated metal, a compound selected from bicyclic, aromatic, organonitrogen compounds. The organonitrogen compounds may be added to the aqueous waste solution either prior to or after precipitation of the metal by chemical reduction.

DETAILED DESCRIPTION OF THE PREFERRED EMBODIMENTS

This invention involves the addition of bicyclic, aromatic, organonitrogen compounds (hereinafter referred to simply as "inhibitors") to a metal-bearing waste solution to prevent redissolution/reoxidation of the metals following precipitation by chemical reduction. In most cases, redissolution can be prevented for a sufficient period of time so that metal levels in the discharged supernatant remain below discharge requirements even though the supernatant is not separated from the precipitated solids for 24 hours or more. Use of these additives will be of benefit in situations where extended time periods between treatment and liquid/solid separation are part of the normal waste treatment process or when an extraordinary situation necessitates an extended time period. In many cases, cost savings can be realized when use of these additives allows a decreased reducing agent requirement.

In the practice of this process, the reducing agent is added to the waste solution under appropriate conditions to bring dissolved metals concentrations below levels required for discharge. An aqueous solution of the inhibitors of this invention is then added in a quantity determined experimentally. The solution is stirred briefly to allow the inhibitor to contact all the precipitated metal particles. The inhibitor can be added to the solution before the dissolved metal ions are precipitated by chemical reduction, although addition after precipitation by chemical reduction is preferred. It has also been found that these additives function best under alkaline pH conditions. They effectively protect copper in the presence of EDTA and $NH_3$ complexing agents, nickel in the presence of the strongly chelating gluconate ion, and cobalt in the presence of citrate and $NH_3$.

In the practice of one embodiment of this invention, a reducing agent (e.g., sodium borohydride, sodium dithionite, or hydrazine) is added to a metal-bearing waste solution to reduce metal ions to the free metal, metal oxide or metal boride. Particles of the metal, metal oxide or metal boride precipitate from solution. (In some cases a precipitated particle will consist of a mixture of free metal, metal oxide and/or metal boride). An aqueous solution of the inhibitor is then added. The solution is stirred thoroughly and for a sufficient length of time to allow the inhibitor to contact all the precipitated metal particles. On a lab scale run, 1–2 minutes stirring is enough. Agitation is stopped and the precipitate allowed to settle. The supernatant is separated from the precipitated solids and discharged.

The inhibitors of this invention that are expected to function effectively in this wastewater treatment process of this invention contain the moiety:

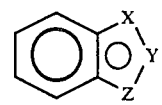

where at least one of the atoms X, Y and Z is a heteroatom, preferably nitrogen and/or sulfur and more preferably where at least one of X, Y and Z is nitrogen.

The bicyclic, aromatic, organonitrogen inhibitors used in this invention are exemplified by benzotriazole, benzothiazole and benzimidazole compounds which are solids. They are organic compounds which contain the bicyclic, aromatic, nitrogen-containing ring structures of the following types:

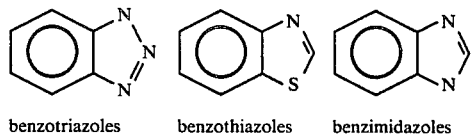

benzotriazoles    benzothiazoles    benzimidazoles

The bicyclic ring structures may be substituted by a variety of substituents as long as these substituents do not interfere with the redissolution/reoxidation inhibitive properties of the compounds. Thus, typical benzotriazole, benzothiazole and benzimidazole compounds useful in the practice of this invention include those according to the following general formulas:

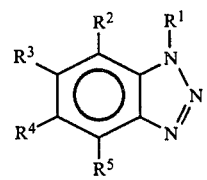

where $R^1$, $R^2$, $R^3$, $R^4$ and $R^5$ are each independently hydrogen atoms or alkyl (e.g. $C_1$–$C_4$ alkyl);

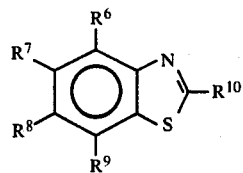

where $R^6$, $R^7$, $R^8$ and $R^9$ are each independently hydrogens atoms or alkyl (e.g. $C_1$-$C_4$ alkyl), and $R^{10}$ is hydrogen, alkyl (e.g. $C_1$-$C_4$ alkyl) or, preferably, —SH; and

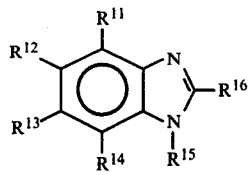

where $R^{11}$, $R^{12}$, $R^{13}$, $R^{14}$ and $R^{15}$ are each independently hydrogen atoms or alkyl (e.g. $C_1$-$C_4$ alkyl), and $R^{16}$ is hydrogen, alkyl (e.g. $C_1$-$C_4$ alkyl) or, preferably, —SH.

Examples of preferred benzotriazole, benzothiazole and benzimidazole compounds include benzotriazole, tolyltriazole, 2-mercaptobenzothiazole, sodium tolyltriazole and sodium 2-mercaptobenzothiazole, 2-mercaptobenzimidazole and sodium 2-mercaptobenzimidazole.

The preferred method of treatment according to the invention involves the addition of the normally solid inhibitor to the waste solution as an aqueous solution. Addition as a liquid allows for process simplification and more rapid and even dispersal making for more effective usage. To have sufficient water solubility, the inhibitors are preferably used as their sodium salts although other alkali metal salts and $NH_4^+$ salts can also be used. However, their usage in all forms including as solids and non-aqueous solutions are included within the scope of this invention.

The inhibitors are most useful in the neutral to alkaline pH range (6.5 to 13) for maximum effectiveness and maximum water solubility. In the preferred treatment method, they are added after the metals are precipitated from solution to form a protective coating thereon. The inhibitors may, however, be equally effective when added prior to or concurrently with the addition to the solution of the chemical reducing agent (i.e., prior to precipitation of the metal by chemical reduction). For example, when the inhibitors were added first to synthetic ammoniacal copper waste solutions, they did not interfere with subsequent sodium borohydride reduction. Protection against redissolution/reoxidation was just as good as when the inhibitors were added after the reduction.

The inhibitors will function effectively at any temperature typical of waste streams, e.g. 10°-50° C.

Quantities of inhibitor to be used depend on several factors: metals concentrations in solution, the particular metal in solution, method of waste treatment (e.g., nature and amount of reducing agent), size of metal particles, nature and amount of complexing agent, and length of time redissolution/reoxidation prevention is desired. Since it is theorized that the protective action of these inhibitors is based on their forming a thin film over the metal particles, in general, the quantity of inhibitor needed is expected to be proportional to the surface area of the reduced, precipitated metals. In general, the amount of inhibitor employed will be that which is sufficient to prevent redissolution/reoxidation of the metal following its precipitation by chemical reduction, but insufficient to actually cause precipitation of the metal prior to the chemical reduction. Empirically, we have found effective molar quantities to range from 1% to greater than 100% of the number of moles of metal (i.e. the molar ratio of inhibitor:metal is about 0.01:1 to at least about 1:1). Of course, since the above factors will almost always vary from one waste solution to the next, accurate predictions of inhibitor usage based solely on metal content is difficult. However, the amount of inhibitor required for any given waste solution may be determined experimentally by a series of trials. It is recommended that initial experiments be done at a 0.5:1 to 1:1 molar ratio of inhibitor to metal. Depending upon the results obtained the quantity of inhibitor can be increased or decreased until the desired degree of redissolution/reoxidation prevention is achieved. For example, we have found that adequate redissolution/reoxidation prevention can be achieved when the amount of inhibitor employed is from about 0.01 to about 1.0 mole of inhibitor per mole of metal.

The thin films formed on the precipitated metal by these inhibitors are believed to be composed of a complex between them and the metal. Since different metals vary in their complexing ability with the inhibitors, inhibitors will be more effective on some metals than on others. They were found to be effective on metals from Group VIIIB and Group IB of the Periodic Table. These metals include copper, nickel and cobalt, the metals most frequently encountered in waste solutions generated in the metal finishing industry. Their use under this invention is not, however, limited to copper, nickel and cobalt. They are expected to be effective on particles of many other metals, such as silver, gold, zinc, cadmium, and the like.

The method of waste treatment will also have an effect on how much inhibitor is needed to keep dissolved metals below discharge limits for the required length of time. Certain reducing agents scavange dissolved oxygen, in addition to reducing the metal ion, and when these are used less inhibitor would be needed. By-products of the reduction can affect the reoxidation rate, requiring more or less inhibitor. The nature of the reduced metal (particle size, surface area, composition) will also affect the reoxidation rate and thereby determine the quantity of inhibitor needed. We have found the reduced metal particle size to have a significant effect on the reoxidation rate. The rate is slower with larger particles due to their smaller surface area compared with the same quantity of metals formed into finer particles. Since chemically reduced precipitates form extremely fine particles having extremely high surface area, reoxidation would be expected to be very difficult to prevent. Thus, it is surprising that the inhibitors of this invention are able to prevent substantially all reoxidation of the precipitate. The nature of the reduction reaction, metals concentration, presence of complexing agents, and use of flocculating aids all have an effect on the particle size, and will be factors in determining inhibitor requirements. Complexing agents normally found in waste streams tend to promote redissolution and/or reoxidation of the metal. When the solution contains large concentrations of complexants, greater quantities of inhibitor will be needed to prevent redissolution and/or reoxidation. The stability of the metal complex is also an important factor in inhibitor usage. For example, EDTA forms strong complexes with both copper and nickel and is more likely to redissolve these metals than ammonia, whose complexes are not as strong. Larger quantities of the inhibitors will be required to compete effectively with EDTA for the metal. As will be seen in the examples which follow, the inhibitors of this invention are effective even on such strong complexes as copper-EDTA, nickel-gluconate and cobalt-citrate.

After treatment of the solution in accordance with this invention, post-metal precipitation processes (flocculation, clarification, filtration, etc.) can be conducted in the usual way. As with any new waste treatment procedure, the best method should be determined based on a series of trials.

EXAMPLE 1

A synthetic EDTA-complexed copper solution was prepared to simulate a typical waste solution generated in the metal plating industry. The solution contained 85 mgCu/L (as $CuSO_4.5H_2O$) and a 50% molar excess (745 mg) of EDTA (disodium salt). A 100-mL portion was treated while being stirred, at pH 7, with 500 mg sodium bisulfite followed by 3.5 mg sodium borohydride. The pH was then raised to 8.0-8.5 with sodium hydroxide, and another 3.5 mg sodium borohydride added. Stirring was continued for another 15 minutes. Copper concentration in solution was reduced to 0.10 mg/L. Two milliliters of a dilute aqueous solution containing 42 mg of sodium tolyltriazole was then added at pH 8.5, with thorough stirring for 1-2 minutes. The copper precipitate was allowed to remain in the solution. In a filtered sample taken 24 hours later, the copper concentration in the supernatant was 3.5 mg/L. When no inhibitor was added a similar sample had a copper concentration of 17 mg/L in the filtrate. Similar improvements were observed with the use of benzotriazole and sodium 2-mercaptobenzothiazole in place of sodium tolyltriazole. Addition of 16 mg of benzotriazole (as a 1% aqueous solution) held dissolved copper concentration to 2.80 mg/L in a filtered sample taken 24 hours after treatment. Use of 2-mercaptobenzothiazole (6.8 mg added as a 1% aqueous solution) held dissolved copper level to 0.31 mg/L.

EXAMPLE 2

A synthetic ammonia-complexed copper solution was prepared to simulate a typical waste stream generated in the metal plating industry. The solution contained 80 mgCu/L (as $CuSO_4.5H_2O$) and 0.36 $gNH_4OH(58\%)/L$. The molar ratio of $NH_3:Cu$ was thus 44:1. 0.4 mg sodium tolyltriazole was added at pH 7. Copper was then reduced by treatment, of a 100 mL sample of the solution, at pH 7, with 500 mg sodium bisulfite plus 3.5 mg sodium borohydride. After 15 minutes, dissolved copper concentration in the supernatant was below 0.1 mgCu/L. The pH was raised to 11 with sodium hydroxide and maintained at 11. The copper precipitate was allowed to remain in the solution and in a filtered sample taken 24 hours later, the copper concentration was 0.4 mg/L. When no inhibitor was added, similar samples had copper concentrations between 2.3-3.1 mg/L.

EXAMPLE 3

A synthetic gluconate-complexed nickel solution was prepared to simulate a typical spent electroless nickel plating bath. The solution contained 2.57 gNi/L (as $NiSO_4.6H_2O$), 24 g sodium hypophosphite/L, and 60.7 g sodium gluconate/L, giving a molar ratio of gluconate:$Ni^{2+}$ of 3.5:1. The pH of a 100 mL sample of the solution was raised to 7.5 and 2 drops of a sodium borohydride aqueous solution containing 40% NaOH and 12% $NaBH_4$ were added. The sodium borohydride solution reacted with $Ni^{2+}$ to produce a catalytic quantity of nickel boride, which catalyzed reduction of remaining $Ni^{2+}$ with hypophosphite. After 30 minutes reaction time, dissolved $[Ni^{2+}]=4.7$ mg/L. At this point, 33 mg of sodium tolyltriazole (1% aqueous solution) was added with thorough stirring for 1-2 minutes. The precipitated nickel was allowed to remain in the solution and in a filtered sample taken 24 hours later, the nickel concentration was 1.1 mg/L. When no inhibitor was added, a similar sample had a nickel concentration of 130 mg/L.

EXAMPLE 4

A synthetic ammonia-complexed copper solution similar to that of Example 2 was treated in a manner similar to that of Example 2, but the inhibitor was added after precipitation of the copper. The amount of copper dissolved in the supernatant was determined after the periods of time indicated in Table I below.

TABLE I

| INHIBITOR | INHIBITOR:Cu MOLAR RATIO | pH | 1 Hour | mg Cu/L After Time Intermediate | 24 Hours | 72-78 Hrs. |
| --- | --- | --- | --- | --- | --- | --- |
| None | — | 9.5 | 0.02 | 1.01 (6 hrs.) | 4.75 | 8.70 |
| Benzotriazole | 1:1 | 9.5 | 0.06 | 0.03 (6 hrs.) | 0.03 | 0.02 |
| Tolytriazole | 1:1 | 9.5 | 0.01 | 0.01 (3 hrs.) | 0.01 | 0.06 |
| Tolyltriazole | 0:1 | 9.5 | 0.02 | — | 0.04 | — |
| None | — | 11 | 0.02 | 0.55 (6 Hrs.) | 2.71 | — |
| Tolytriazole | 0.1:1 | 11 | 0.04 | 0.05 (6 Hrs.) | 0.56 | — |
| Tolytriazole | 0.05:1 | 11 | 0.03 | — | 0.14 | — |

The copper solution was also treated by adding the inhibitor to the copper solution before the copper was precipitated, followed by precipitation of the copper by chemical reduction in a manner similar to that of Example 2. The results are indicated in Table Ia below.

TABLE Ia

| INHIBITOR | INHIBITOR:Cu MOLAR RATIO | mg Cu/L After Time 15 mins. | 24 Hours |
| --- | --- | --- | --- |
| None | — | 0.02 | 2.71 |
| Tolyltriazole | 0.1:1 | 0.07 | 0.58 |
| Tolyltriazole | 0.01:1 | 0.05 | 0.41 |

EXAMPLE 5

A synthetic EDTA-complexed copper solution similar to that of Example 1 was treated in a manner similar to that of Example 1, (i.e. the inhibitor was added after precipitation of the copper) and the amount of copper dissolved in the supernatant determined after the period of time indicated in Table II below.

TABLE II

| INHIBITOR | INHIBITOR:Cu Molar Ratio | mg Cu/L After Time | | |
|---|---|---|---|---|
| | | 15–30 min. | 1 Hr. | Intermediate | 24 Hrs. |
| None | — | 0.06 | 1.63 | 5.05 (5 Hrs.) | 17.2 |
| Benzotriazole | 5:1 | — | 0.02 | — | 1.58 |
| Benzotriazole | 2:1 | — | 0.04 | 0.35 (2 Hrs.) | 2.11 |
| Benzotriazole | 1:1 | 0.01 | 0.18 | 1.01 (2.5 Hrs.) | 2.80 |
| Benzotriazole | 0.5:1 | 0.02 | 0.02 | 0.79 (3 Hrs.) | 8.47 |
| Tolyltriazole | 5:1 | 0.02 | 0.02 | 0.02 (2 Hrs.) | 3.35 |
| Tolyltriazole | 2:1 | — | 0.13 | — | 3.54 |
| Tolyltriazole | 1:1 | — | 0.15 | — | 7.60 |

EXAMPLE 6

A synthetic gluconate-complexed nickel solution similar to that of Example 3 was treated in a manner similar to that of Example 3, except that the inhibitor was added about 30 minutes after precipitation of the nickel, and the amount of nickel dissolved in the supernatant determined after the period of time indicated in Table III below.

TABLE III

| INHIBITOR | INHIBITOR:Ni Molar Ratio | mg Ni/L After Time | | |
|---|---|---|---|---|
| | | 30 min.[a] | 1 Hr. | 24 Hrs. |
| None | — | 0.35 | 1.20 | 127 |
| Tolyltriazole | 5:1 | 1.40 | 0.10 | 0.01 |
| Tolyltriazole | 2:1 | 3.00 | 0.02 | 0.01 |
| Tolyltriazole | 1:1 | 2.05 | 0.05 | 0.02 |
| Tolyltriazole | 0.5:1 | 5.00 | 0.06 | 0.01 |

[a]Inhibitor added at this point.

EXAMPLE 7

A synthetic ammonia-complexed copper solution similar to that of Example 2 was treated by sodium dithionite reduction. The pH of a 100 mL sample was adjusted to 7, and 70 mg of sodium dithionite powder were added. After 15 minutes reaction time, dissolved copper concentration was below 0.10 mg/L. At this point, the inhibitors were added as aqueous solutions. The pH was then raised to 11 with sodium hydroxide and maintained at 11. The amount of copper dissolved in the supernatant was determined after the period of time indicated in Table IV below.

TABLE IV

| INHIBITOR | INHIBITOR:Cu MOLAR RATIO | Copper Levels (mg Cu/L) After Time | | |
|---|---|---|---|---|
| | | 15 min[a] | Intermediate | 24 h |
| None | — | 0.02 | 2.30 (19.5 h) | 5.50 |
| Benzotriazole | 0.5:1 | 0.01 | 0.35 (18.5 h) | 0.47 |
| Tolyltriazole | 0.5:1 | 0.01 | 0.24 (19 h) | 0.38 |
| 2-Mercaptobenzothiazole | 0.1:1 | 0.07 | 0.27 (18 h) | 2.08 |
| 2-Mercaptobenzimidazole | 0.1:1 | 0.06 | 0.20 (17.5 h) | 1.53 |

[a]Inhibitor added at this point.

EXAMPLE 8

A synthetic EDTA-complexed copper solution similar to that of Example 1 (except $[Cu^{2+}]=114$ mg/L) was treated in a manner similar to that of Example 1, except the quantities of reducing agents used were 200 mg sodium bisulfite and 9.6 mg sodium borohydride at pH 7, followed by 6.4 gm sodium borohydride at pH 8.0–8.5. Results are indicated in Table V below.

TABLE V

| INHIBITOR | INHIBITOR:Cu Molar Ratio | Copper Levels (mg Cu/L) After Time | |
|---|---|---|---|
| | | 15 min[a] | 24 h |
| None | — | 0.15 | 20.7 |
| 2-Mercaptobenzothiazole | 1:1 | 0.05 | 0.43 |
| 2-Mercaptobenzimidazole | 1.5:1 | 0.17 | 1.24 |

[a]Inhibitor added at this point

EXAMPLE 9

A synthetic, uncomplexed cobalt solution containing 100 mg Co/L (as $CoCl_2.6H_2O$) was prepared. A 100-mL portion was treated while being stirred, at pH 8–8.5, with 64 mg sodium borohydride. After 2 minutes reaction time, the cobalt concentration in solution was reduced to below 2 mg/L. At this point, the inhibitors were added as aqueous solutions. The amount of cobalt dissolved in the supernatant was determined after the period of time indicated in Table VI.

TABLE VI

| Inhibitor | Inhibitor:Co Molar Ratio | Cobalt Levels (mg Co/L) After Time | | | |
|---|---|---|---|---|---|
| | | 2 min[a] | 15 min | Intermediate | 24 h |
| None | — | 1.44 | 8.43 | — | — |
| Benzotriazole | 1:1 | 1.62 | 0.06 | 0.02 (2 h) | 0.03 |
| Benzotriazole | 0.5:1 | 2.95 | 0.12 | 0.02 (3 h) | 0.02 |
| Benzotriazole | 0.1:1 | 1.28 | 0.66 | 1.73 (3 h) | 27 |
| Tolytriazole | 0.25:1 | 7.0 | 0.09 | 0.17 (2.5 h) | 0.37 |
| 2-Mercaptobenzothiazole | 2:1 | 0.33 | 0.47 | 0.62 (2 h) | High |
| 2-Mercaptobenzothiazole | 1:1 | 0.74 | 0.71 | 1.37 (2 h) | High |
| 2-Mercaptobenzothiazole | 0.5:1 | 1.78 | 1.99 | 4.90 (2 h) | High |
| 2-Mercaptobenzimidazole | 1:1 | 1.88 | 0.96 | 7.35 (2 h) | High |

[a]Inhibitor added to this point

EXAMPLE 10

A synthetic complexed cobalt solution was prepared to simulate a typical spent electroless cobalt bath. The solution contained 100 mg Co/L (as $CoCl_2.6H_2O$), 895 mg sodium citrate/L, and 1.28 g ammonium chloride/L. Sodium hypophosphite was not included. A 100-mL portion was treated while being stirred, at pH 7, with 280 mg sodium dithionate. After 10 minutes reaction time, the cobalt concentration in solution was reduced below 1 mg/L. At this point the inhibitors were added as aqueous solutions. The amount of cobalt dissolved in the supernatant was determined after the period of time indicated in Table VII.

TABLE VII

| Inhibitor | Inhibitor:Co Molar Ratio | Cobalt Levels (mg Co/L) After Time | | |
|---|---|---|---|---|
| | | 10 min[a] | 60 min | 24 h |
| None | — | 0.47 | 2.20 | 5.48 |
| Benzotriazole | 2:1 | 0.28 | 0.49 | 1.12 |
| Benzotriazole | 0.5:1 | 0.86 | 1.98 | 3.35 |
| Tolyltriazole | 1:1 | 0.85 | 1.65 | 3.65 |

TABLE VII-continued

| Inhibitor | Inhibitor:Co Molar Ratio | Cobalt Levels (mg Co/L) After Time | | |
|---|---|---|---|---|
| | | 10 min[a] | 60 min | 24 h |
| Tolyltriazole | 0.5:1 | 0.53 | 3.68 | 4.73 |
| 2-Mercaptobenzothiazole | 1:1 | 0.31 | 6.40 | 24.1 |
| 2-Mercaptobenzothiazole | 0.1:1 | 0.56 | 1.31 | 13.3 |
| 2-Mercaptobenzimidazole | 2:1 | 0.54 | 1.35 | 21.1 |
| 2-Mercaptobenzimidazole | 0.5:1 | 0.53 | 5.80 | 21.8 |

[a]Inhibitor added at this point

We claim:

1. A process for preventing redissolution and reoxidation of metal precipitates in an aqueous complexing or oxidizing solution, said metal having been precipitated by chemical reduction, said process comprising adding to the aqueous solution, in an amount insufficient to cause precipitation of said metal but sufficient to prevent redissolution and reoxidation of the precipitate, a bicyclic, aromatic, organonitrogen compound.

2. The process of claim 1 wherein the bicyclic, aromatic, organonitrogen compound is selected from the group consisting of benzotriazoles, benzothiazoles and benzimidazoles.

3. The process of claim 2 wherein the compound is selected from the group consisting of benzotriazole, tolyltriazole, 2-mercaptobenzothiazole, 2-mercaptobenzimidazoles, and alkali metal salts of tolyltriazole, 2-mercaptobenzothiazole, and 2-mercaptobenzimidazole.

4. The process of claim 1 wherein the metal is a Group VIIIB or Group IB metal.

5. The process of claim 4 wherein the metal is selected from the group consisting of copper, nickel and cobalt.

6. The process of claim 1 wherein the bicyclic, aromatic, organonitrogen compound is employed in an amount such that the molar ratio of organonitrogen compound:metal is from about 0.01:1 to about 1:1.

7. The process of claim 1 wherein the bicyclic, aromatic, organonitrogen compound is added to the aqueous solution prior to precipitation of the metal.

8. The process of claim 1 wherein the bicyclic, aromatic, organonitrogen compound is added to the aqueous solution after precipitation of the metal.

9. In a process for removing dissolved metal from an aqueous waste solution by precipitating the metal by chemical reduction, the improvement comprising preventing redissolution and reoxidation of the precipitated metal by adding to the aqueous waste solution, in an amount insufficient to cause precipitation of said metal but sufficient to prevent redissolution and reoxidation of the precipitated metal, a bicyclic, aromatic, organonitrogen compound.

10. The process of claim 9 wherein the bicyclic, aromatic, organonitrogen compound is selected from the group consisting of benzotriazoles, benzothiazoles and benzimidazoles.

11. The process of claim 10 wherein the compound is selected from the group consisting of benzotriazole, tolyltriazole, 2-mercaptobenzothiazole, 2-mercaptobenzimidazole and alkali metal salts of tolyltriazole, 2-mercaptobenzothiazole, and 2-mercaptobenzimidazole.

12. The process of claim 9 wherein the metal is a Group VIIIB or Group IB metal.

13. The process of claim 12 wherein the metal is selected from the group consisting of copper, nickel and cobalt.

14. The process of claim 9 wherein the bicyclic, aromatic, organonitrogen compound is employed in an amount such that the molar ratio of organonitrogen compound:metal is from about 0.01:1 to about 1:1.

15. The process of claim 9 wherein the bicyclic, aromatic, organonitrogen compound is added to the aqueous waste solution prior to precipitation of the metal.

16. The process of claim 9 wherein the bicyclic, aromatic, organonitrogen compound is added to the aqueous waste solution after precipitation.

* * * * *